United States Patent Office 3,847,870
Patented Nov. 12, 1974

---

3,847,870
METHOD FOR MAKING POLYETHERIMIDES
Tohru Takekoshi, Scotia, N.Y., assignor to General
Electric Company, Schenectady, N.Y.
No Drawing. Filed Nov. 23, 1973, Ser. No. 418,381
Int. Cl. C08g 20/32
U.S. Cl. 260—47 CP            11 Claims

ABSTRACT OF THE DISCLOSURE

A method is provided for making polyetherimides through an imide-amine exchange reaction catalyzed by alkali metals, alkaline earth metals and basic compounds thereof. Displacement of organic monoamine from bis(N-organophthalimide) is effected under melt conditions with organic diamine. The polyetherimide can be used as an injection moldable thermoplastic.

METHOD FOR MAKING POLYETHERIMIDES

The present invention relates to a method for making polyetherimides involving a catalyzed imide-amine exchange reaction between an organic diamine and a bis(N-organophthalimide) under melt conditions.

As shown in copending application of Darrell R. Heath and Tohru Takekoshi, Ser. No. 346,473, filed Mar. 30, 1973, and assigned to the same assignee as the present invention, aromatic bis(ether anhydride)s are made by the base-catalyzed hydrolysis of an intermediate aromatic bis(etherphthalimide), as shown by the following equation:

(I)

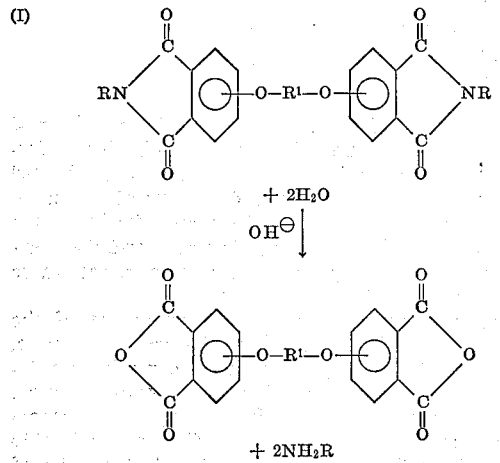

+ 2H$_2$O

OH$^\ominus$ ↓

+ 2NH$_2$R where R and R$^1$ are as defined below.

The above aromatic bis(ether anhydride)s can then be employed to make polyimides by effecting reaction between the bis(ether anhydride) and an organic diamine. Although making polyimides by reacting aromatic bis(ether anhydride)s and organic diamines provides valuable results, the aromatic bis(ether anhydride) as shown by the above equation requires the hydrolysis of the corresponding bisimide. The hydrolysis of the bisimide is effected after an intermediate tetra acid salt is acidified to the tetra-acid, followed by the dehydration of the aromatic bis(ether anhydride). It would be desirable to make polyetherimides by an alternative method which does not require the use of aromatic bis(ether anhydride). The steps needed to make the dianhydride intermediate would thus be eliminated.

The present invention is based on the discovery that polyetherimides can be made directly from aromatic bis-(etherphthalimide)s of formula (I), without converting such aromatic bis(etherphthalimide) to the corresponding aromatic bis(ether anhydride). The results of the present invention are achieved by utilizing organic diamine of the formula (II)            NH$_2$—R$^2$—NH$_2$ in combination with such aromatic bis(etherphthalimide) in the presence of an effective amount of a catalyst selected from an alkali metal, alkali metal compound, alkaline earth metal and alkaline earth metal compound, whereby an imideamine exchange reaction is effected resulting in the displacement of organic monoamine by the above-described organic diamine of formula II.

As employed hereinafter, R is a monovalent C$_{(1-20)}$ organic radical selected from C$_{(1-8)}$ alkyl radicals, for example, methyl, ethyl, propyl, butyl, pentyl, etc.; C$_{(6-20)}$ aromatic radicals, such as phenyl, tolyl, xylyl, naphthyl, etc.; R$^1$ is selected from C$_{(6-30)}$ divalent aromatic organic radicals; and R$^2$ is a divalent organic radical selected from the class consisting of (a) aromatic hydrocarbon radicals having from 6-20 carbon atoms and halogenated derivatives thereof, (b) alkylene radicals, C$_{(2-8)}$ alkylene terminated polydiorganosiloxane cyclo-alkylene radicals having from 2-20 carbon atoms, and (c) divalent radicals included by the formula,

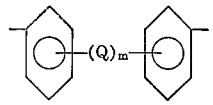

where Q is a member selected from the class consisting of

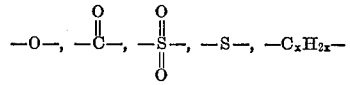

and $x$ is a whole number from 1 to 5 inclusive, and $m$ is 0 or 1.

There is provided by the present invention a method for making a polyetherimide which comprises, (1) effecting the removal of organic amine of the formula (III)            RNH$_2$ from a melt consisting essentially of a mixture of the bisimide of formula (I) and substantially equal molar amount of such bisimide of an organic diamine of formula II in the presence of an effective amount of a basic catalyst, where the vapor pressure of the organic amine is greater under atmospheric conditions than the vapor pressure of the organic diamine, where R is as previously defined.

Radicals included by R$^1$ are more particularly,

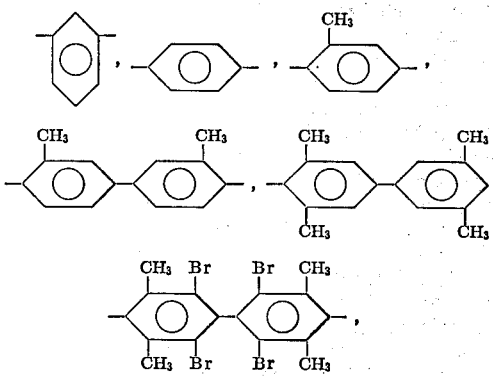

and

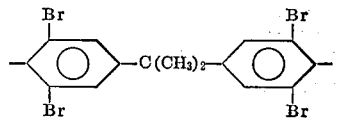

and divalent organic radicals of the general formula

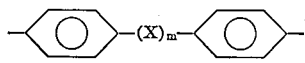

where X is a member selected from the class consisting of divalent radicals of the formulas

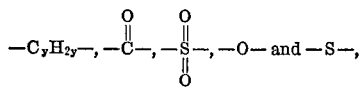

where $m$ is as previously defined, $y$ is a whole number from 1 to 5.

Alkali metals which can be utilized in the practice of the invention are, for example, lithium metal, sodium metal, cesium metal, rubidium metal, potassium, etc. Compounds of such alkali metals such as hydroxides, oxides, hydride, carbonates, amides, carboxylates, etc. also can be used. Additional examples of alkali metal compounds which can be used are basic compounds such as the alkali ammonium phosphates, antimonate, etc. and basic compounds, shown in Hackh's Chemical Dictionary, Fourth Edition (1969), McGraw-Hill Book Company, New York, under, for example, "sodium," pp. 616–622, and the other alkali metals listed. In addition to the aforementioned alkali metals and compounds, there also can be used alkaline earth metals and compounds, such as magnesium metal, calcium metal, barium metal, strontium metal, beryllium metal and the respective oxides, carbonates, hydrides, carboxylates, etc. thereof. The alkaline earth metal compounds are also shown in Hackh's Chemical Dictionary on pp. 401–403, for magnesium, etc. An effective amount of the basic catalyst is from 0.001% to 1% and more particularly from 0.01% to 0.05% by weight, based on the weight of bis(etherphthalimide) and organic diamine.

As shown in copending application Ser. No. 346,473, the aromatic bis(etherphthalimide)s of formula (I) can be made by effecting the nitro displacement of a nitrophthalimide, for example, N-phenyl - 3 - nitrophthalimide, N-phenyl - 4 - nitrophthalimide, with an alkali diphenoxide such as the sodium or potassium salt of such dihydric phenols as bisphenol-A, 2,2-bis(2 - hydroxyphenyl)propane, etc. The aforementioned nitrophthalimide can be made by effecting reaction between the corresponding nitrophthalic anhydride and an organic amine of formula (III), such as, for example, aniline, toluidine, etc.

Included by the organic diamines of formula (II) are, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

Additional examples of the dihydric phenols used to make the alkali diphenoxides employed to make the aromatic bis(etherimide)s of formula (I) are, for example, 2,2-bis(2-hydroxyphenyl)propane;
2,4'-dihydroxydiphenylmethane;
bis(2-hydroxyphenyl)methane;
2,2-bis(4-hydroxyphenyl)propane hereinafter identified as "bisphenol-A" or "BPA";
1,1-bis(4-hydroxylphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
hydroquinone;
resorcinol;
3,4'-dihydroxydiphenylmethane;
4,4'-dihydroxybenzophenone; and
4,4'-dihydroxydiphenyl ether.

In the practice of the invention, a mixture of equal molar amounts of aromatic bis(etherphthalimide) of formula (I), and organic diamine of formula (II), is heated until the mixture is at least partially converted to a melt. Stripping along with agitation of the melt facilitates the initial removal of the mono-organic amine and the eventual removal of the organic diamine in instances where an excess amount of the latter is utilized.

Depending upon such factors as the nature of the aromatic bis(etherphthalimide) and the organic diamine, the glass transition temperature of the resulting polyetherimide, the boiling range of the mono-organic amine, the degree of agitation such as by stirring, etc., temperatures between about 200° C.–400° C., and preferably from 220° C. to 300° C. can be employed. The order of addition of the catalyst to the mixture of ingredients of the organic diamine and the aromatic bis(etherphthalimide) is not critical. Preferably, the catalyst is incorporated into the mixture of ingredients prior to converting the mixture to the molten state. The employment of reduced pressure, such as from 10 to 60 torr during the course of the imide-amine exchange reaction has been found to facilitate the removal of the mono-organic amine and the formation of the polyetherimide. Reaction time can vary from 2 hours to 4 hours or more depending upon a variety of factors such as the degree of agitation, the temperature of the polymerization mixture, the temperature of the melt, the nature of the reactants, etc.

Although equal molar amounts of the organic diamine and the aromatic bis(etherphthalimide) provide for high molecular weight polyetherimide, in certain instances an excess of the organic diamine can be employed resulting in the production of polyetherimide having terminal amine groups. The polyetherimide made in accordance with the practice of the invention consists essentially of chemically combined polyetherimide units of the formula,

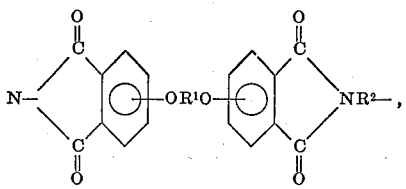

where $R^1$ and $R^2$ are as previously defined, and can have an intrinsic viscosity in dimethylformamide at 25° C. of 0.1 to 0.3 dl./g. These polyimides can be reinforced with finely divided fillers such as silica, carbon whiskers, glass fibers, etc. having from 30 to 80 parts of filler per 100 parts of polymer.

In order that those skilled in the art will be better able to practice the invention, the following examples are given by way of illustration and not by way of limitation. All parts are by weight.

EXAMPLE 1

A mixture of 3.4199 parts of 2,2-bis[4-(N-phenylphthalimid-4-oxy)phenyl]propane and 1.3678 part of 4,4'-diaminodiphenylmethane, and 0.0004 part of potassium carbonate was heated to a temperature of 220° C. for one hour at a pressure of about 60 torr. Nitrogen was continuously introduced into the mixture while it was heated. The methylene dianiline initially melted followed by the conversion of the mixture to the molten state. The mixture was heated for an additional period of 30 minutes at 260–270° C. for 10 torr for one hour. After the mixture had been heated for 2½ hours, the melt became very viscous. The mixture was free of aniline resulting from its displacement from the bisimide by the methylene dianiline. The polymerization was continued at 270–280° C. at 0.3 torr for 30 minutes and finally at 300° C. at 0.3 torr for 2½ hours. At the final stage of the polymerization, nitrogen bubbles were formed only occasionally due to the high viscosity of the melt. The product was allowed to cool to room temperature. There was obtained an amber colored glassy material having an intrinsic viscosity in dimethylformamide of 0.28 dl./g. Based on method of preparation, the product was a polyetherimide consisting essentially of the following chemically combined units

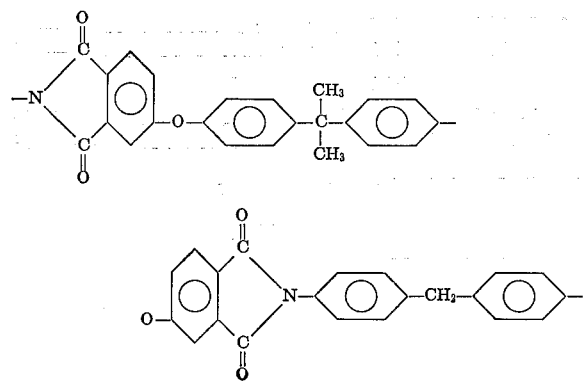

EXAMPLE 2

A mixture of 1.841 parts of 1,4-bis(N-phenylphthalimid-3-oxy)benzene, 0.6878 part of 1,12-diaminododecane and 0.0009 part of magnesium benzoate was stirred and heated at 220° C. under a nitrogen atmosphere of 40 torr for 15 minutes. Aniline was formed and it was distilled off. The resulting viscous melt was further heated at 240° C. and 0.3 torr for one hour. On cooling, a tough, strongly fluorescent polymer was obtained. The inherent viscosity of the polymer in *meta*-cresol was 0.36 (c.=0.5%). Based on method of preparation, the polymer was a polyetherimide consisting essentially of the following chemically combined units

EXAMPLE 3

A mixture of 3.353 parts of 2,2-bis[4-(N-phenylphthalimid-4-oxy)phenyl]propane, 1.021 parts of 4,4'-diaminodiphenylmethane and 0.002 part of lithium metal was heated at 250° C. under a nitrogen atmosphere of 60 torr for 45 minutes. Aniline was formed and it was distilled off. The viscous melt was further heated at 260° C. and 0.5 torr for an additional 45 minutes. The IR spectrum of the resulting polymer product was identical with that obtained from the corresponding dianhydride and the diamine. The inherent viscosity of the polymer in dimethylformamide was 0.31 (c.=0.72%). Based on method of preparation and its IR spectrum, the polymer was a polyetherimide consisting essentially of the following chemically combined units

EXAMPLE 4

A mixture of 3.476 parts of 4,4'-bis(N-phenylphthalimid-3-oxy)biphenyl, 1.30 parts of hexamethylenediamine and 0.005 part of calcium hydride was stirred and heated at 220° C. under a nitrogen atmosphere for 30 minutes. During the reaction, aniline formed and it was distilled off. The pressure was gradually reduced to about 20 torr over a period of 15 minutes and the excess amount of hexamethylenediamine was distilled off. The resulting viscous melt was further heated at 250° C. and 0.3 torr for one hour. On cooling, a yellow glassy polymer was obtained. The inherent viscosity of the polymer in *meta*-cresol was 0.17 (c.=0.5%).

Based on method of preparation, the polymer was a polyetherimide consisting essentially of chemically combined units of the formula,

EXAMPLE 5

A mixture of 3.353 parts of 2,2'-bis[4-(N-phenylphthalimid-3-oxy)phenyl]propane, 2.032 parts of 4,4'-diaminodiphenyl ether and 0.0005 part of sodium amide was heated to melt at 250° C. under nitrogen atmosphere. The pressure was maintained at 60 torr for 15 minutes during which time aniline was distilled off. The viscous melt was further heated at 260° C. and 0.5 torr for additional 30 minutes. On cooling, a yellow glassy polymer was obtained. The inherent viscosity of the polymer in dimethylformamide was 0.23 (c.=0.76%). Based on method of preparation of the polymer was a polyetherimide consisting essentially of the following chemically combined units

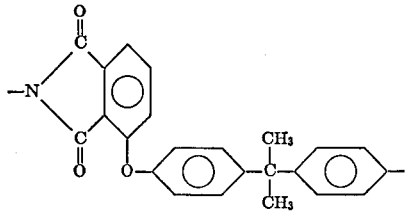

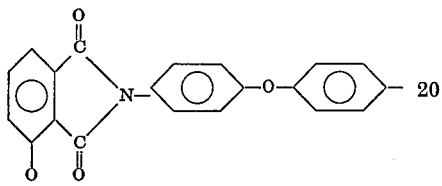

Although the above examples are limited to only a few of the very many bisimides, organodiamines and catalysts which can be employed in the method of the present invention, it should be understood that the present invention includes the use of bisimides of formula I, organic diamine of formula II and the basic catalysts shown in the description preceding these examples.

What I claim as new and desire to secure by Letters Patent of the United States is:

1. A method for making a polyetherimide which comprises
(1) effecting the distillation of organic amine of the formula $$RNH_2$$

from a melt consisting essentially of a mixture of bisimide of the formula

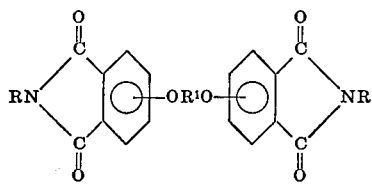

and at least an equal molar amount of such bisimide of an organic diamine of the formula $$NH_2-R^2-NH_2$$

in the presence of an effective amount of a catalyst, selected from the class consisting of an alkali metal, a basic alkali metal compound, an alkaline earth metal and a basic alkaline earth metal compound, where the vapor pressure of the organic amine is greater under atmospheric conditions than the vapor pressure of the organic diamine, where R is a monovalent $C_{(2-20)}$ organic radical selected from $C_{(2-8)}$ alkyl radicals and $C_{(6-20)}$ aromatic radicals, $R^1$ is selected from $C_{(6-30)}$ aromatic radicals, and $R^2$ is a divalent organo radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxane cyclo-alkylene radicals having from 2-20 carbon atoms, and (c) divalent radicals included by the formula,

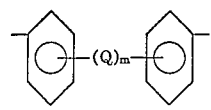

where Q is a member selected from the class consisting of

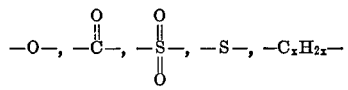

and $x$ is a whole number from 1 to 5 inclusive, and $m$ is 0 or 1.

2. A method in accordance with claim 1, where the bisimide is 2,2-bis[4-(N-phenylphthalimid-4-oxy)phenyl]propane.
3. A method in accordance with claim 1, where the bisimide is 2,2-bis[4-(N-phenylphthalimid-3-oxy)phenyl]propane.
4. A method in accordance with claim 1, where the organic diamine is 4,4'-diaminodiphenyl methane.
5. A method in accordance with claim 1, where the organic diamine is 4,4'-diaminodiphenyl ether.
6. A method in accordance with claim 1, where the organic diamine is hexamethylene diamine.
7. A method in accordance with claim 1 where the catalyst is lithium metal.
8. A method in accordance with claim 1, where the catalyst is potassium carbonate.
9. A method in accordance with claim 1, where the catalyst is magnesium benzoate.
10. A method in accordance with claim 1, where the catalyst is calcium hydride.
11. A method in accordance with claim 1, where the catalyst is sodium amide.

References Cited

UNITED STATES PATENTS

| 3,699,075 | 10/1972 | Lubowitz | 260—49 |
| 3,736,290 | 5/1973 | Fessler | 260—46.5 |

FOREIGN PATENTS

| 224,056 | 6/1968 | U.S.S.R. | 260—47 CP |
| 257,010 | 7/1970 | U.S.S.R. | 260—47 CP |

LESTER L. LEE, Primary Examiner

U.S. Cl. X.R.

260—47 CZ, 78 TF